US006398837B1

(12) United States Patent
Alvin et al.

(10) Patent No.: US 6,398,837 B1
(45) Date of Patent: Jun. 4, 2002

(54) METAL-CERAMIC COMPOSITE CANDLE FILTERS

(75) Inventors: Mary Anne Alvin, Pittsburgh; Dennis M. Bachovchin, Delmont; Gerald J. Bruck, Murrysville, all of PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/586,644

(22) Filed: Jun. 5, 2000

(51) Int. Cl.[7] .............................................. B01D 46/00
(52) U.S. Cl. ....................... 55/486; 55/523; 55/DIG. 30
(58) Field of Search ........................... 55/486, 487, 523, 55/DIG. 30

(56) References Cited

U.S. PATENT DOCUMENTS

| 4,364,760 A | | 12/1982 | Higuchi et al. |
| 4,417,908 A | | 11/1983 | Pitcher, Jr. |
| 4,448,833 A | | 5/1984 | Yamaguchi et al. |
| 4,629,483 A | * | 12/1986 | Stanton |
| 4,746,341 A | * | 5/1988 | Komoda |
| 4,810,273 A | * | 3/1989 | Komoda |
| 4,867,639 A | | 9/1989 | Strangman |
| 4,888,114 A | * | 12/1989 | Gaddis et al. |
| 4,968,467 A | * | 11/1990 | Zievers |
| 5,069,697 A | | 12/1991 | Hamaguchi et al. |
| 5,071,457 A | * | 12/1991 | Schmidt, Jr. et al. |
| 5,185,018 A | * | 2/1993 | Zievers et al. |
| 5,185,019 A | | 2/1993 | Haldipur et al. |
| 5,223,138 A | | 6/1993 | Zievers et al. |
| 5,433,771 A | | 7/1995 | Bachovchin et al. |
| 5,460,637 A | * | 10/1995 | Connoly et al. |
| 5,500,029 A | * | 3/1996 | Zievers et al. |
| 5,605,553 A | * | 2/1997 | Connolly et al. |
| 5,856,025 A | | 1/1999 | White et al. |
| 5,876,471 A | | 3/1999 | Lippert et al. |
| 5,902,363 A | * | 5/1999 | Connolly et al. |
| 5,948,257 A | | 9/1999 | Custer et al. |
| 6,080,219 A | * | 6/2000 | Jha et al. |
| 6,123,746 A | * | 9/2000 | Alvin et al. |
| 6,273,925 B1 | * | 8/2001 | Alvin et al. |

FOREIGN PATENT DOCUMENTS

JP                 2-241411       *  9/1990  ................. 55/523

* cited by examiner

Primary Examiner—Duane S. Smith

(57) ABSTRACT

An axially elongated candle filter element (28') is made having an open end, a closed end and porous walls (86) around an axially elongated passageway volume (88) where the walls are of an open metal structure (86), preferably a honeycomb structure, placed at a 90 degree angle to and surrounding the axis (90—90) of the inner volume, where the structure (86) is filled with porous ceramic material (84) through which hot gases can pass to reach the passageway (88).

14 Claims, 4 Drawing Sheets

METAL-CERAMIC COMPOSITE CANDLE FILTERS

BACKGROUND OF THE INVENTION

1. Field of the Invention

This invention relates generally to hot-gas cleanup systems for feed gas to turbines; and more particularly, to a candle filter for such systems that includes an attached fail-safe/regenerator device, where the candle filter is a combination of a ceramic material within a supporting metal matrix.

2. Background Information

Modern industrial methods have resulted in a need for an apparatus that is capable of efficiently filtering high temperature combustion gases containing particulate material. In combustion turbine applications, for example, a combustion turbine uses energy generated from hot pressurized combustion gases produced by burning natural or propane gas, petroleum distillates or low ash fuel oil. When coal and other solid fuels are burned, particulates carried over from the combustion of such solid fuels can cause turbine blade erosion and fouling. An efficient system for filtering of such hot combustion gases would permit the use of such solid fuels. As another example, in conventional boiler operations, the boilers undergo routine shutdown for cleaning the fireside surfaces and for inspection. An efficient hot gas filtering system would greatly extend the life and operational time for a boiler to operate between inspections. Fouling of the fireside surface due to ash deposition and corrosion would be eliminated or minimized.

Also, as a key component in advanced coal-or biomass-based power applications, hot gas filtration systems protect the downstream gas turbine components from particle fouling and erosion, cleaning the process gas to meet emission requirements. When installed in either pressurized fluidized-bed (PFBC) combustion plants, pressurized circulating fluidized-bed combustion plants (PCFBC), or integrated gasification combined cycle plants (IGCC), lower downstream component costs are projected, in addition to improved energy efficiency, lower maintenance, and elimination of additional expensive fuel or flue gas treatment systems. As a critical component, long-term performance, durability, and life of the filter elements and associated high temperature gasket seals are essential to the successful operation of hot gas filtration systems in advanced combustion and gasification applications.

U.S. Pat. Nos. 5,185,019 and 5,433,771 (Haldipur et al. and Bachovchin et al., respectively) teach filtering apparatus including fail-safe/regenerator filter bodies and gasket assemblies that can be employed with conventional ceramic candle filters. In U.S. Pat. No. 5,876,471 (Lippert et al.), FIGS. 5 and 8 show state-of-the-art conventional ceramic monolithic candle filters and thin wall composite candle filters. The ceramic monolithic candle filters are usually thicker than the ceramic composite and/or ceramic filament wound, or metal and/or intermetallic filters. The ceramic composite filters have side walls about 1.0 mm to 5.0 mm thick and are made thinner by use of fibers and a rigidized matrix of SiC, alumina or aluminate silicate, and are generally lighter in weight than the monolithic ceramic filter elements. Fracture toughness was expected to be improved via use of the ceramic fiber reinforced composite matrix.

In all cases, the main candle filter is attached to a fail-safe/regenerator filter device which prevents particulate matter from traveling into the clean gas area of the pressure vessel if a ceramic filter element fails. Additionally, U.S. Ser. No. 09/263,436, filed on Mar. 4, 1999, now U.S. Pat. No. 6,123,746, Alvin et al., provided an improved rolled/layered gasket with a non-integral fail-safe/regenerator filter, and U.S. Ser. No. 09/393,561, filed on Sep. 10, 1999, now U.S. Pat. No. 6,273,925, Alvin et al., teaches an all-metal candle filter with reduced use of gaskets, and an integral fail-safe/regenerator filter device, similar to Bachovchin et al.

While these inventions provide advances in the art, enhanced strength, thermal fatigue resistant, oxidation and corrosion resistant candle filters are needed. Besides these specific type candle filters, others have provided porous ceramic honeycomb structures used as filters, as taught in U.S. patent application Ser. Nos. 4,364,760, 4,417,908 and 5,069,697 (Higuchi et al., Pitcher, and Hamaguchi et al., respectively). These structures have parallel channels through the body with alternating ends of the channels being sealed along both faces of the filter element, where gases generally pass through the channels parallel to the walls, except when passing through the channel walls to exit the filter. They are used to trap dust from gas on Diesel engines. In U.S. Pat. No. 4,448,833 (Yamaguchi et al.) a ceramic honeycomb structure, for use as a catalyst carrier or filter, was filled with a ceramic slurry containing organic solids, which after firing created fine interconnected holes within the supporting ceramic matrix, which vastly increased the filtering surface area. Strangman, in U.S. Pat. No. 4,867,639, utilized a soft ceramic, such as $CaF_2$ or $BaF_2$, to fill a honeycomb structure, as an abradable seal structure in gas turbines.

In U.S. Pat. No. 5,856,025 (White et al.) taught forming a ceramic-reinforced aluminum matrix composite by contacting a porous ceramic with molten aluminum-magnesium alloy, which infiltrated the ceramic mass to form an aluminum matrix. In U.S. Pat. No. 5,223,138 (Zievers et al.) a ceramic candle filter made of ceramic fibers and ceramic binder was bonded to an internal metallic perforate reinforcing member and the whole further coated with a ceramic material. Another supported candle filter is taught in U.S. Pat. No. 5,948,257 (Custer et al.) where ceramic fabric or yarn of, for example, mullite or silica is used as an inner and outer support layer for a reticulated ceramic foam interior.

Experience has shown that oxidation of non-oxide-based continuous fiber reinforced ceramic composites ("CFCC"), reticulated foam ceramic matrices, and clay bonded nonoxide-based ceramic matrices has resulted when these materials are used in the construction of porous candle filter elements which experienced long-term field operation, that is 500–3000 hours or greater of pressurized fluidized-bed combustion ("PFBC") or pressurized circulating fluidized-bed combustion ("PCFBC"). Similarly, thick oxide-based ceramic monoliths were shown to be susceptible to thermal fatigue and/or shock during process operation. CFCC and filament wound matrices were shown to have low strength semi-densified flanges; have low strength and load bearing filter bodies; have the potential for embrittlement of the contained CFCC fibers; and to possibly debond along inserted plugs, seams, applied membranes, component layers, and the like. Additionally, in the development of porous metal filters, concern has been raised as to the long-term stability and corrosion resistance of the approximate 5 to 100 micrometer fibers or powder particles that are used to manufacture such all metal candle filter configurations.

There is still a need to develop higher reliability candle filter configurations for use in advanced coal-fired operation applications. Finally, it would be desirable that any improved filter be able to substitute into existing systems in the field.

SUMMARY OF THE INVENTION

Therefore, it is a main object of this invention to provide an improved candle filter having improved filtering capability and strength, and which is resistant to embrittlement, oxidation, and thermal and/or chemical degradation from sulfur, alkali, chlorides, and/or other contaminants found in process gas streams.

It is a further object of this invention to provide an improved candle filter that can easily substitute for existing units.

These and other objects are accomplished by providing an axially elongated candle filter element having an open end, a closed end and a porous wall defining an axially elongated inner volume, wherein the porous wall comprises an open metal structure disposed transverse to (90°) and surrounding the axis of the axially elongated inner volume, said open metal structure having an oxide coating on its surfaces, where the structure is filled with ceramic material to a density of from 30% to 70% of theoretical density, where at least one of the inner or outer surfaces of the filled structure has a membrane layer. Preferably, the candle filter element is tubular and the wall comprises an open metal honeycomb structure.

Fabrication of the metal-ceramic composite filter element with a hemispherical flange provides for ease of retrofit capabilities of the candles into existing filter operating systems with associated gasketing, fail-safe/regenerator, and mounting hardware. Should the standard hemispherical flange or a geometry thereof be fabricated as a dense metallic structural unit integral with the ceramic-filled metal structure, direct welding to either the fail-safe/regenerator or to the filter housing is feasible. Alternately, the ceramic-filled metal cylindrical tube manufactured without a flange can be welded directly to an integral metal fail-safe/regenerator and/or filter housing.

These metal-ceramic filter elements: preferably utilize a metallic or intermetallic honeycomb lattice to structurally reinforce the oxide-based ceramic filter matrix; mitigate catastrophic thermal fatigue failure of the oxide-based filter element through containment of the ceramic matrix within the honeycomb lattice; can be initially manufactured to near shape through the use of the metal honeycomb lattice, minimizing additional finishing after incorporation of the oxide-based material within the lattice, application of the outer and/or inner surface membrane, and final high firing; can be easily manufactured to the design tolerance specifications for immediate retrofit and use in existing field test facilities; and the increased thickness of the nonporous wall of the honeycomb lattice increases the extended life of the metal or intermetallic media over that of the fine grained particles or fibers currently used to manufacture porous metal media filter elements.

BRIEF DESCRIPTION OF THE DRAWINGS

For a better understanding of the invention, reference may be made to the exemplary embodiments shown in the accompanying drawings, which.

DESCRIPTION OF THE PREFERRED EMBODIMENTS

Figure 1:
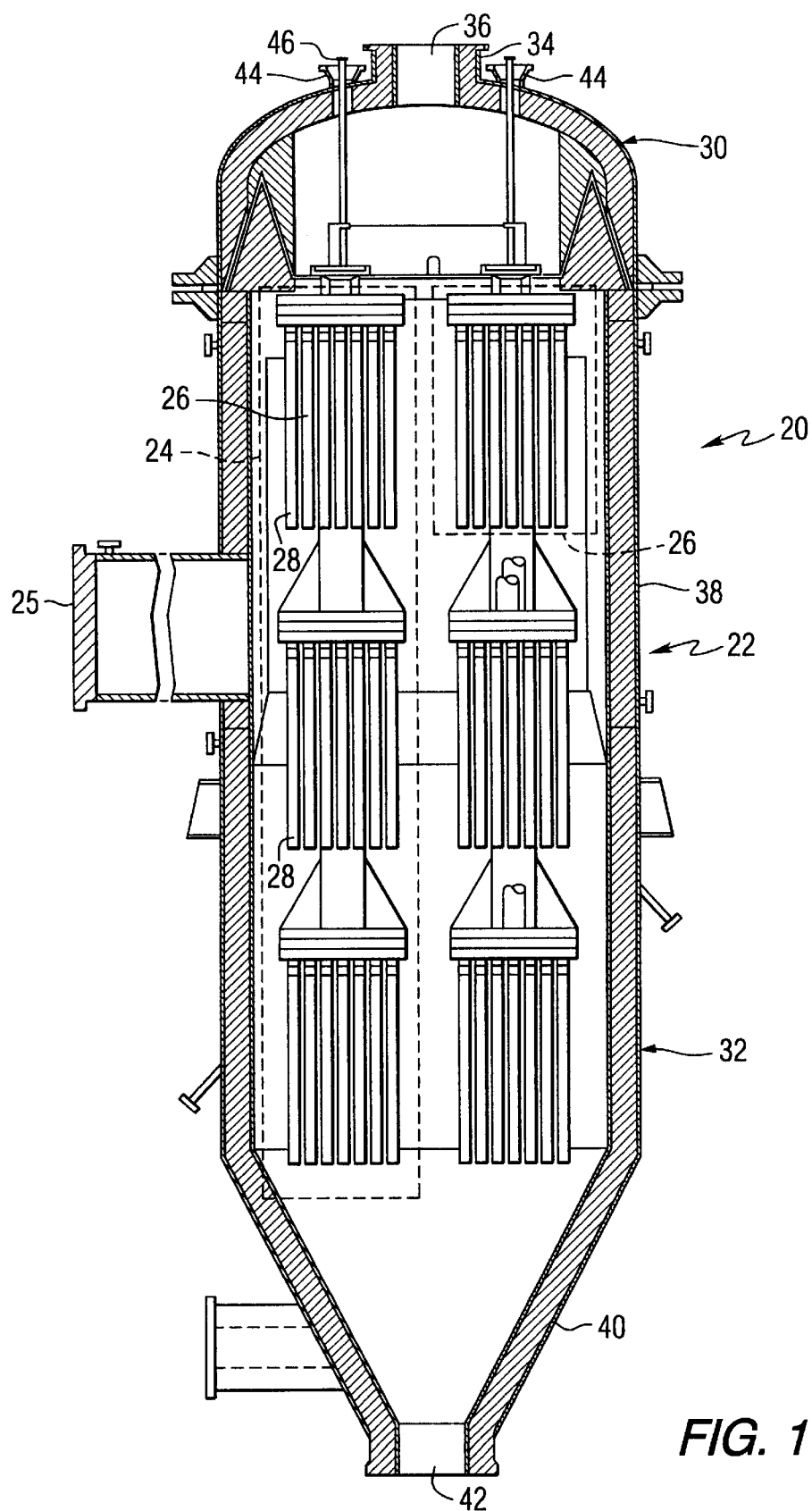
FIG. 1 is a longitudinal section view of a pressure vessel incorporating a filter assembly in accordance with the present invention.

FIG. 1 shows a filtering apparatus 20 for separating particulate matter from a gas stream. This apparatus includes a pressure vessel 22 in which there are mounted a plurality of clusters 24 comprising a plurality of filter element arrays 26. These filter element arrays 26 include a plurality of metallic, intermetallic and/or ceramic filter elements 28.

The pressure vessel 22 has a dome-shaped head 30 and a body 32. The dome-shaped head 30 terminates in a linear tip 34, defining an exit opening or nozzle 36 for the filtered gas to be removed from the vessel 22. The body 32 includes a dirty gas inlet 25, where gas enters at a temperature of from about 1110° F. (600° C.) to about 1830° F. (1000° C.). The body also contains an upper part 38 having a generally circular cylindrical shape joined by a frustoconical ash hopper 40 for receiving the particulate matter, terminating in a linear tip defining an opening or nozzle 42 connected to an ash discharge line. A plurality of ports 44 extend from the dome-shaped head 30. The ports 44 provide a site for inserting instrumentation and for viewing the interior of the dome-shaped head 30 during shut-down periods. Through each port, tubes 46 for supplying a back pulse burst of gas for cleaning the filters 28 can be placed.

Figure 2:
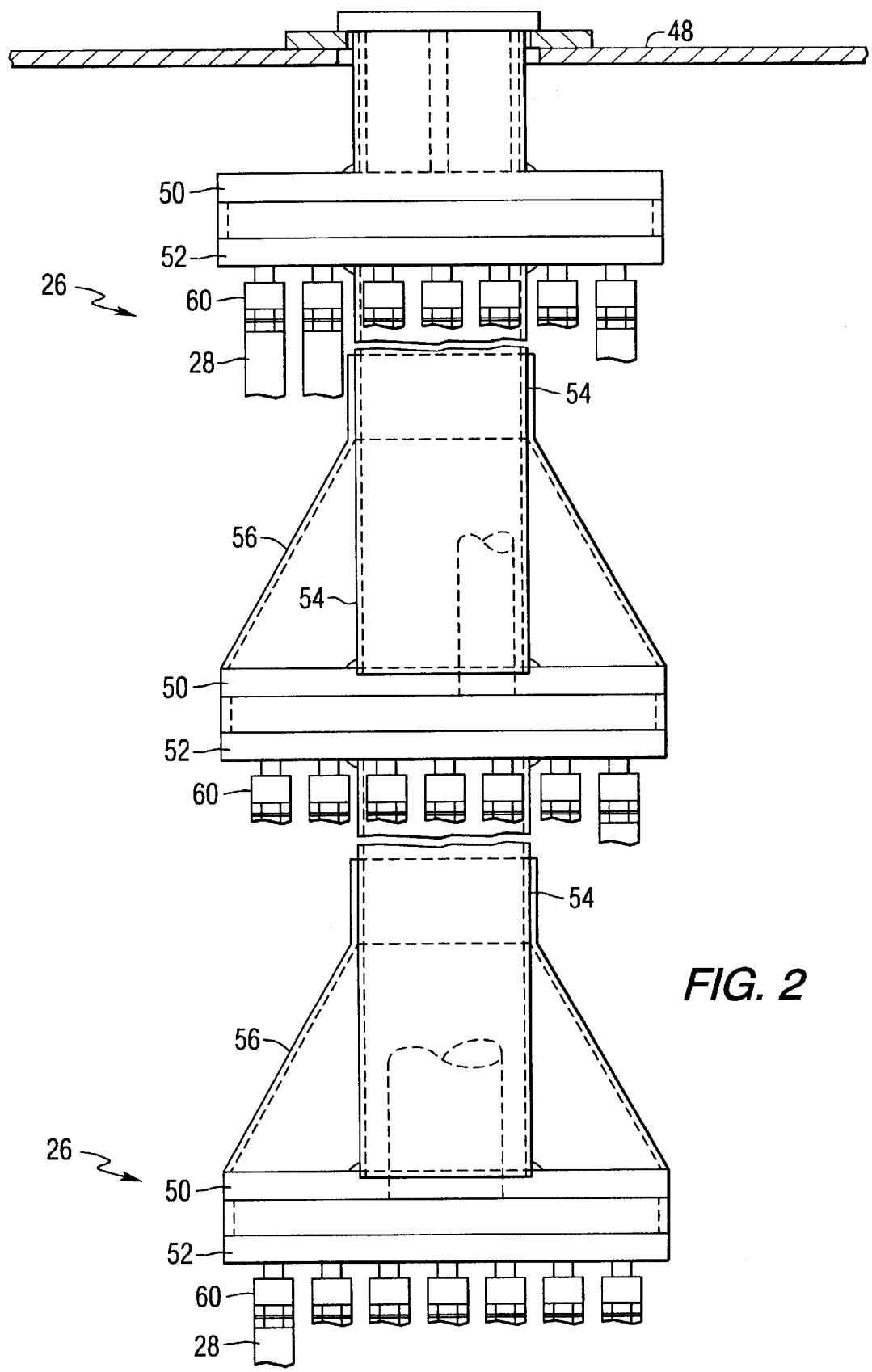
FIG. 2 is a side elevation view of an array of filter assemblies, including filter elements, coupled to a tube sheet as shown in FIG. 1.

Referring to FIG. 2, the pressure vessel includes a tube sheet 48. The tube sheet 48 supports the plurality of filter element arrays 26. Each filter element array 26 comprises a manifold plenum consisting of an upper plate 50 and a lower plate 52 and side plate. In accordance with the present invention, each filter element 28 is held by a filter assembly 60 and coupled to the corresponding lower plate 52 of the manifold plenum. The filter assemblies 60 are integrated into a structural unit by plenum support pipes 54. Each plenum support pipe 54 is secured centrally within the pressure vessel 22. A dust shed or particle-deflector 56 having a generally frustoconical shape is also shown.

Figure 3:
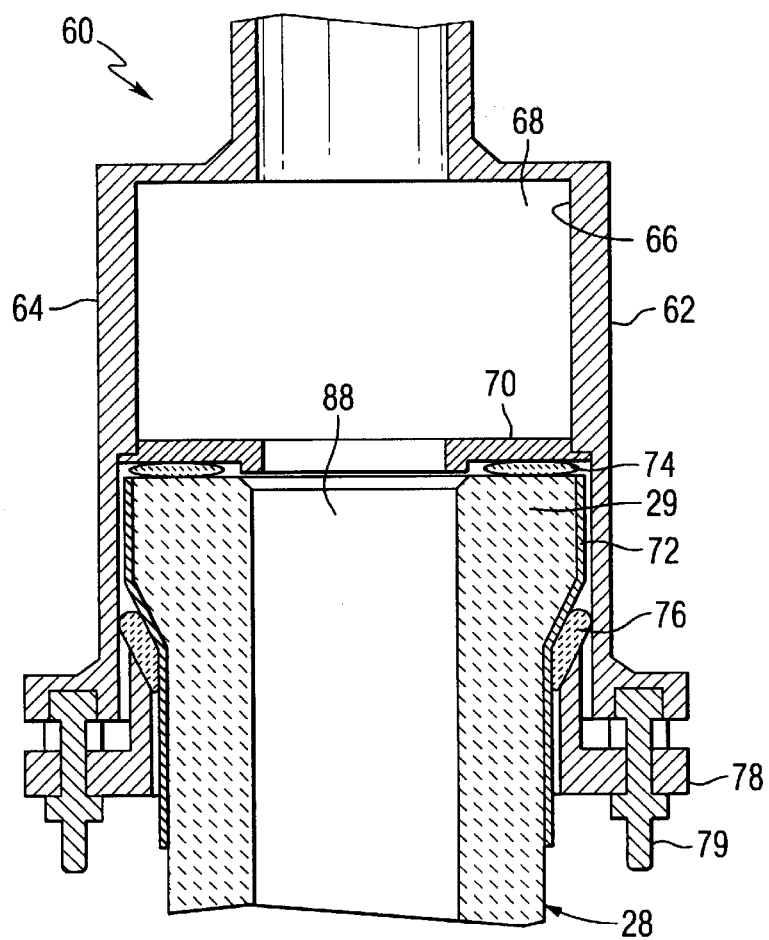
FIG. 3 is a sectional view of a filter holder and gasket assembly employed with a conventional monolithic thick-walled candle filter.

Referring to FIG. 3, one example of a filter assembly 60 is shown. The filter assembly 60 comprises a filter housing 62 having a peripheral sidewall 64 which defines an interior chamber 66, a fail-safe/regenerator device 68, removably or permanently mounted within the interior chamber 66, an annular spacer ring 70 usually permanently mounted onto the fail-safe/regenerator device 68, within the interior chamber 66, a candle filler flange 29 of a candle filter 28, a gasket sock or sleeve 72, a top compliant gasket 74, a middle compliant gasket 76, and a lower cast nut 78 and bolt 79.

Preferably, the spacer ring 70 is permanently mounted to the fail-safe/regenerator to produce a single unit that is placed within the interior chamber 66 of the filter housing. The spacer ring 70 may be welded in abutment with the fail-safe/regenerator device 68 to secure the fail-safe/regenerator 68 unit and to prevent the filter element 28 with top end flange 29 from moving, thereby preventing possible damage to the filter element 28. The fail-safe/regenerator device 68 can contain fine and/or coarse mesh or wire screens and also, for example, ceramic shapes or hollow metal Raschig rings as a back up filter, provided to prevent particulate matter from travelling into the clean gas area of the pressure vessel if a filter element fails, is damaged or breaks. Additionally, the fail-safe/regenerator 68 will heat the back pulsed gas which is generally cooler than the gas stream to prevent the filter elements 28 from enduring thermal fatigue or cracking.

Figure 4:
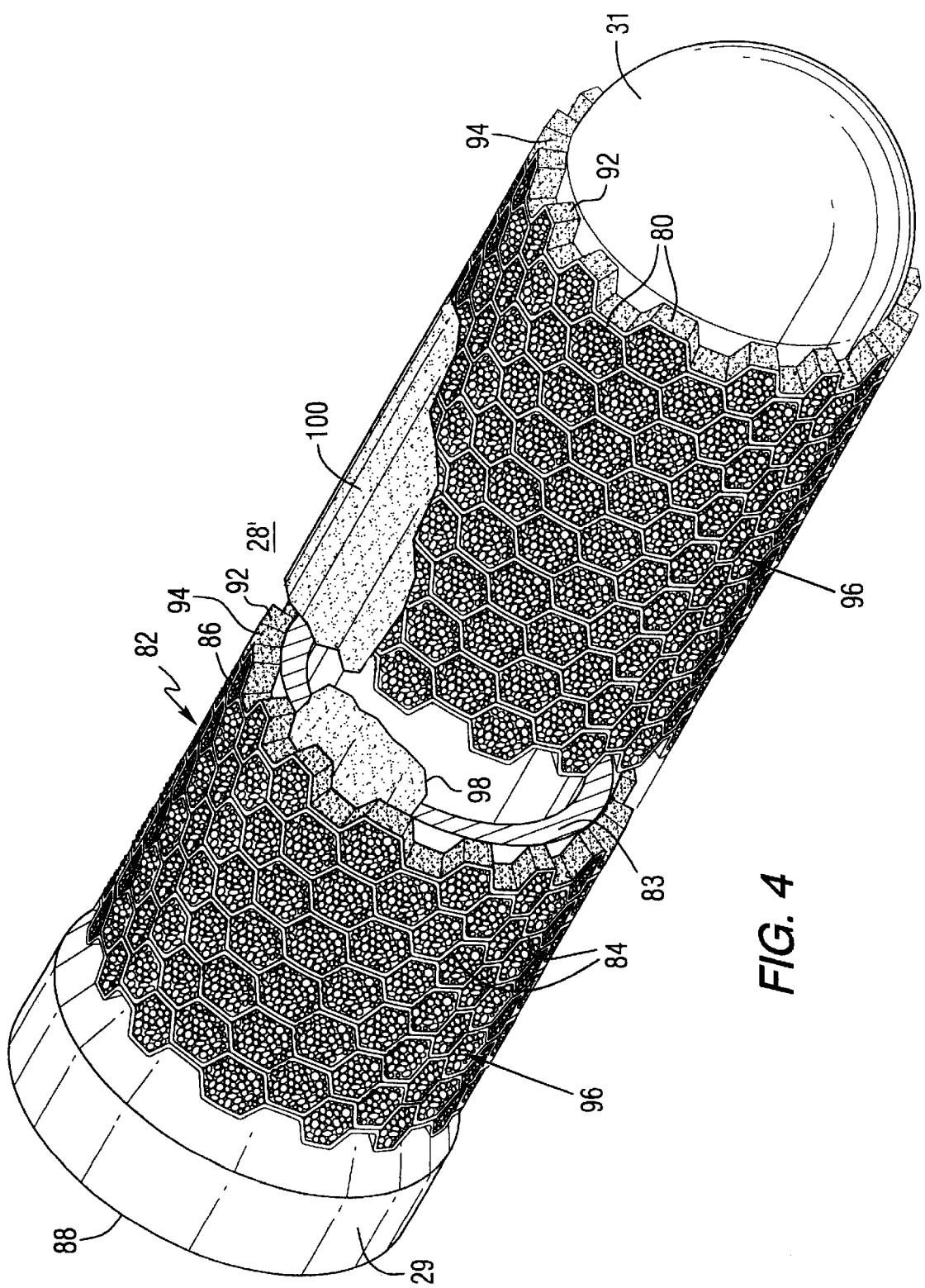
FIG. 4, which best describes the invention, is a three dimensional sectional view of one embodiment of a candle filter, showing the preferred honeycomb metal-ceramic candle filter.

A preferred embodiment of the filter element 28 is shown in FIG. 4. FIG. 4 shows a series of consolidated hexagonal honeycomb units 86, made of foil sections 80, best shown in FIG. 5, which have been welded together, and optionally disposed around a mandrel 83, to provide the metal honeycomb structure 82, filled with ceramic material 84, providing the axially elongated metal honeycomb-ceramic candle filter element 28', with top hemispherical flange end 29 and bottom end 31 with end cap, enclosing an axially elongated inner volume passageway 88 for passage of filtered clean air.

Figure 5:
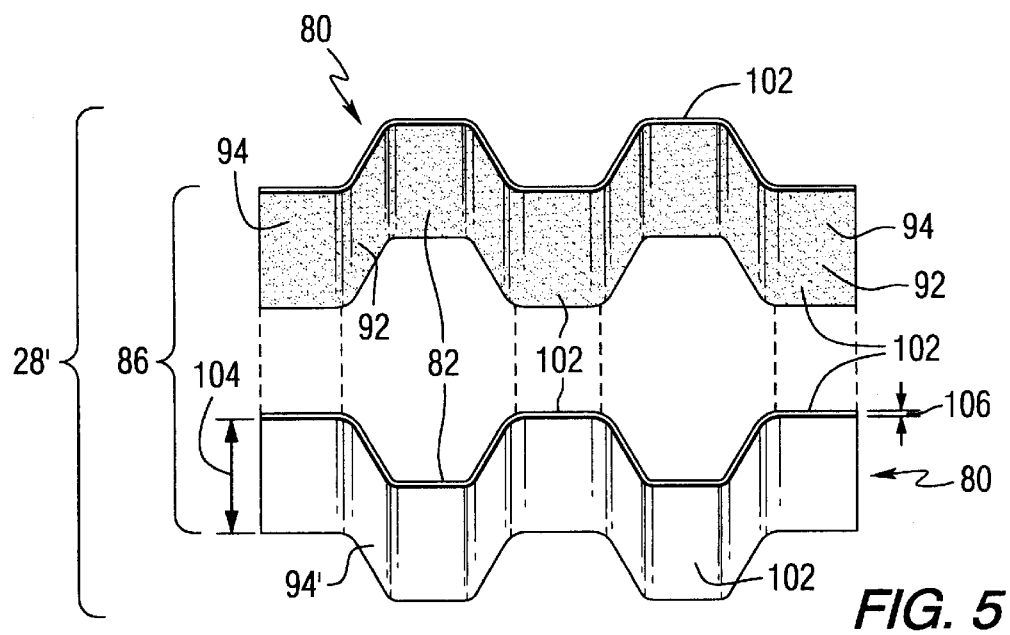
FIG. 5 is a three-dimensional sectioned view of oxide-coated metal and/or intermetallic honeycomb element sections of FIG. 4 before joining and being formed into a candle filter.

For simplicity, the filter element 28' is shown as and will be described as a tubular form-that is, a round cylinder with a uniform surface; however, it can also be made in various other configurations, such as triangular sections or the like of joined honeycomb structures. The filter elements can be architected, for example, as either: a straight tube which then is welded to a flange and end cap, or a configuration containing the flange contour and end cap within said strip to form an integral lengthwise section of the geometrically-formed candle configuration. The preferred concept for joining filter elements of trigonal or the like configurations to a densified metal flange of a defined contour, so as to facilitate retrofit into existing filter systems and complete sealing, is through the use of a modified flange geometry containing either a separate metal adapter or an integral design which replicates the trigonal, tetragonal, hexagonal, octagonal, and the like, configuration of the filter element. Alternative embodiments of the filter element 28' would include: a fully circular cylindrical tube with one longitudinal weld seam; and a geometrically-formed tube (of a trigonal, tetragonal, hexagonal, octagonal, and the like, configuration) with multiple longitudinal weld seams, wherein the surfaces of the geometric form are strips of the metal-ceramic structure welded to a metal rod. Additionally, while the 6-sided honeycomb structure 86 welded as shown in FIG. 5 is preferred, it should be understood that the structure 86 can also be constructed of tubular elements or other hollow shapes, such as triangular shapes and the like. However, for simplicity, the invention will be described for the preferred honeycomb structure shown in FIGS. 4 and 5.

The filter element 28' is made of joined walls, preferably tubular in shape, of open metal or intermetallic honeycomb units 86, made of foil sections 80, disposed transverse (at a 90° angle) to and surrounding the passageway 88. An oxide coating 92 is either formed in situ or bonded to the honeycomb interior walls 94 and exterior walls 94', and each honeycomb unit is filled with porous ceramic material 84 and sintered to form a 30% to 70% dense (30% to 70% porous) filter media, through which hot gases 96 contaminated with particulates pass to reach passageway 88. An inner porous membrane 98 and/or outer porous membrane 100 shown in section are preferably layered and bonded to the candle filter 28' to remove particulate from further passage into the porous metal-ceramic filter matrix 84. The hemispherical flange 29, as well as the end cap 31, of the filter element may be integral with the cylindrical tube or welded to the cylindrical tube as either dense or porous structures. The hemispherical flange and end cap may be either of comparable open cell porosity of the honeycomb cylindrical tube, or be fabricated from a tighter pore cell, or from a dense metal.

FIG. 5 shows an exploded view of the candle filter element 28' (not all shown) showing to-be-joined honeycomb walls units 86 being formed, with oxide coating 92 either formed in situ or bonded to the honeycomb interior and exterior foil walls 94 and 94'. As can be seen, a plurality of honeycomb foil sections 80 would be welded together at contact points 102 to form a honeycomb structure 82, which units 86 or series of units can be bent and formed, and then the unit sections welded along the length of the cylindrical tube to provide the completed honeycomb candle filter element 28' of FIG. 4.

An example of construction of such a metal-ceramic honeycomb candle filter element shown in FIG. 5 follows, where the term "metal" is defined as including intermetallic materials, as will be described below. The wall thickness 104 of the porous cylindrical metal-ceramic candle filter element may be up to 10 mm, preferably from 3 mm to 5 mm. The wall thickness 106 of the dense metal or intermetallic corrugated foil used to manufacture the honeycomb may be 75 micrometers to 250 micrometers, preferably from 100 micrometers to under 150 micrometers, with an open cell channel or honeycomb width 101 (see FIG. 4) of 2.5 mm to 6.0 mm. The smaller the tube wall thickness 104, the easier to bend the honeycomb unit 86 to form the axially elongated candle structure 28'.

The composition of the metal honeycomb, tubular, or other structure 86 includes, but is not limited to, the use of Ni or Fe based materials containing substantial Cr, that is over about 12 wt. % Cr, for example Haynes™ 214 (approximate wt. %: 16% Cr, 3% Fe, 0.05% C, 0.2% Si, 0.5% Mn, 0.01% B, 4.5% Al, 0.1% Zr, 0.01% Y, Ni balance); intermetallics, such as the metal aluminides FeAl, NiAl and TiAl, FeCrAlY (approximate wt. 22.5% Cr, 5% Al, 0.5% Y, Fe balance); PM2000 (20% Cr, 5% Al, 0.5% Ti, 0.5% $Y_2O_3$, Fe balance), and the like. Pretreatment of the metal honeycomb cylindrical structure is such that an in-situ stable oxide layer is formed along the outer surfaces of the honeycomb network. For Haynes™ 214, a tightly adhering alumina protective layer is formed along the surface of the metal at temperatures greater than 1750° F. (955° C.), or alternately, a mixed alumina-chrome oxide scale results at temperatures less than 1750° F. (955° C). The intermetallics which can be used promote growth of an alumina-enriched surface layer. All of the oxide layers are important to provide enhanced oxidation of the metal or intermetallic honeycomb substrate 86 for use in advanced coal-based combustion systems. Similarly, oxidation is known to be enhanced through the use of FeCrAlY, where yttrium further stabilizes the chromia-alumina-enriched outer surface protective scale. For PM 2000, a chromia-enriched external scale is expected to be formed. Alternately, a wash coat containing preferably alumina can be deposited along the interior and exterior foil walls 94 and 94', respectively, of metal honeycomb structure 86. Subsequent high firing would promote adherence to the underlying metallic or intermetallic honeycomb matrix.

A dense slurry containing 1 micrometer to 50 micrometer diameter alumina particles would be applied to all surfaces of the honeycomb structure via dip coating, vacuum infiltration, and the like, as a step to forming the ceramic filler 84 in FIG. 4. Alternately, a sol-gel mixture containing 1 micrometer to 20 micrometer diameter, 100 micrometer to 200 micrometer length chopped alumina fibers (for example, Nextel™ 610 fibers, Nextel™ 720 fibers, Saffil fibers, and the like) would be applied to all surfaces of the honeycomb structure via dip coating, vacuum infiltration, and the like.

The metal-ceramic composite cylindrical tube would then be heated to temperatures of 2010° F. to 2280° F. (1100° C.

to 1250° C.) in order to sinter bond the alumina particles or fibers to the pre-oxidized, alumina-enriched, honeycomb surface. Sinter bonding via point contact between particles or fibers provides sufficient open porosity (that is, 30% to 70% open porosity) for gas flow, yet a sufficiently tortuous channel path through the filter wall to assist in the bulk filtration and capture of particulates which permeate through the external filter membranes during pressurized fluidized-bed combustion, pressurized circulating fluidized-bed combustion, or integrated gasification combined cycle process operation. The 30% to 70% porous, alumina particle or fiber matrix that would be sinter bonded to the alumina-enriched outer surface of the metallic or intermetallic honeycomb structure serves as the structural support surface or substrate for application of a finer grained alumina particle (0.5 micrometer to 10 micrometer diameter), or a higher density, 0.5 micrometer to 10 micrometer diameter, fiber-containing, 10 micrometer to 100 micrometer thick membrane along the outer surface and/or inner surface of the filter element, shown as 100 and 98 in FIG. 4, respectively.

The outer or inner membrane coatings would be applied via spray or dip coating, or the like. Sinter bonding of the outer or inner membrane to the underlying ceramic filled metal or intermetallic honeycomb structure at 2010° F. to 2280° F. (1100° C. to 1250° C.) would enhance the structural affinity between both membrane and structural support layers. The alumina powder or fibers which are used to fill the open channels of the honeycomb lattice, or which are applied to the outside diameter and/or inside diameter surface of the filter element exhibit high temperature oxidative stability during high temperature process operation in combustion gas environments, thus promoting extended life of the filter element.

The present invention may be embodied in other forms without departing from the spirit or essential attributes thereof, and accordingly reference should be made to both the appended claims and the foregoing specification as indicating the scope of the invention.

What is claimed is:

1. An axially elongated candle filter element having an open end, a closed end and a porous wall defining an axially elongated inner volume, wherein the porous wall comprises an open metal structure disposed transverse to and surrounding the axis of the axially elongated inner volume, said open metal structure having walls with an oxide coating on its surfaces, where the structure is filled with ceramic material to a density of from 30% to 70% of theoretical density, where at least one of the inner or outer surfaces of the filled structure has a membrane layer.

2. The candle filter element of claim 1, where the membrane layer is a ceramic.

3. The candle filter element of claim 1, where the wall thickness of the candle filter element is up to 10 mm and where the thickness of the metal structure walls is from 75 micrometers to 250 micrometers.

4. The candle filter element of claim 1, where the wall thickness of the candle filter element is from 1 mm to 5 mm and where the thickness of the metal structure walls is from 100 micrometers to 150 micrometers.

5. The candle filter element of claim 1, where the ceramic material filling the open metal structure is a porous sintered ceramic with tortuous channel paths therethrough.

6. The candle filter element of claim 1, where the ceramic material filing the open metal structure comprises sinter bonded materials selected from the group consisting of particles of ceramic having diameters from about 1 micrometer to about 50 micrometers, fibers of ceramic having lengths from about 100 micrometers to about 200 micrometers, and mixtures thereof.

7. The candle filter element of claim 5, where the ceramic material filing the open metal structure is alumina.

8. The candle filter element of claim 1, where the walls of the open metal structure are made from a material selected from a Ni or Fe based material containing substantial Cr.

9. The candle filter element of claim 8, where the open metal structure contains a stable metal oxide layer along its outside surfaces.

10. The candle filter element of claim 1, where the membrane layer is sinter bonded to the candle filter element surface and has a thickness of from about 10 micrometers to about 100 micrometers.

11. The candle filter element of claim 1, having a top hemispherical flange and a bottom end cap.

12. The candle filter element of claim 1, where the open metal structure is a honeycomb structure.

13. The candle filter element of claim 1, where the filter element has tubular walls.

14. The candle filter element of claim 1, comprising part of a filter assembly also containing a fail-safe/regenerator device and a filter housing.

* * * * *